United States Patent
Bilet et al.

(10) Patent No.: US 8,870,633 B2
(45) Date of Patent: *Oct. 28, 2014

(54) CRYO-SHUCKING OF OYSTERS

(71) Applicant: Elwha LLC, Bellevue, WA (US)

(72) Inventors: Maxime Jean Jerome Bilet, Seattle, WA (US); Grant Lee Crilly, Seattle, WA (US); Nathan P. Myhrvold, Medina, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/912,962

(22) Filed: Jun. 7, 2013

(65) Prior Publication Data

US 2014/0051341 A1 Feb. 20, 2014

Related U.S. Application Data

(63) Continuation of application No. 13/373,041, filed on Nov. 1, 2011, now abandoned.

(51) Int. Cl.
*A22C 29/04* (2006.01)

(52) U.S. Cl.
CPC .................................. *A22C 29/046* (2013.01)
USPC ........................................................ 452/12

(58) Field of Classification Search
USPC ............................................ 452/1, 12, 15–17
See application file for complete search history.

(56) References Cited

U.S. PATENT DOCUMENTS

| | | | |
|---|---|---|---|
| 3,594,860 A | 7/1971 | Nelson et al. | |
| 4,312,099 A | 1/1982 | Cohen | |
| 4,505,004 A | 3/1985 | Joensen | |
| 5,059,151 A * | 10/1991 | Kiczek | 452/13 |
| 6,086,468 A | 7/2000 | Yoshida et al. | |
| 7,048,961 B2 | 5/2006 | Knauf | |
| 8,480,459 B2 * | 7/2013 | Bilet et al. | 452/12 |

OTHER PUBLICATIONS

"Food and Drink: How to Shuck Oysters"; Maryland Info.Com; printed on Oct. 31, 2011; pp. 1-3; located at: http://www.marylandinfo.com/sponsorships/how_to_shuck_oysters.html.
"Oyster"; Wikipedia, the free encyclopedia; printed on Oct. 31, 2011; pp. 1-13; located at: http://en.wikipedia.org/wiki/Oyster.

* cited by examiner

*Primary Examiner* — Richard Price, Jr.

(57) ABSTRACT

A cryogen-blanching technique involves brief exposure of an oyster shell to a cryogen. The cryo-blanching weakens the oyster's muscles that close the bivalve tightly shut, but preserves the natural condition of the bulk of the oyster meat. The weakening of the oyster's holding muscles allows shucking the oyster meat in its fresh or natural state without damage or shell fragments.

18 Claims, 5 Drawing Sheets

FIG. 3

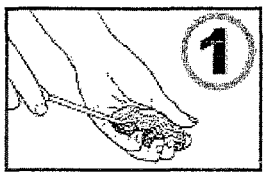

Step 1: Hold the oyster firmly in one hand, knife in the other. Slip the knife blade between the top and bottom shell right by the hinge on back.

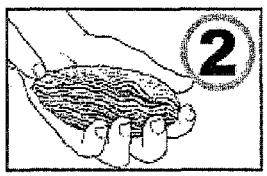

Step 2: Run the knife the way around the oyster until you get to the other side.

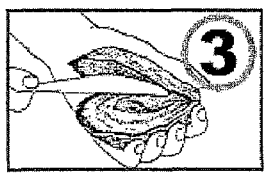

Step 3: Using a twisting motion, pry the top and bottom shells apart. Be gentle but firm so you don't lose any of the liquor inside.

Step 4: Cut the oyster free from his shell. He'll be connected by a tough knob on his underside; slide your knife under and sever it.

"How to shuck oysters" as shown at website

Marylandinfo.com/sponsorships/how_to_shuck_oysters.html

410 providing an oyster in a bivalve shell, wherein the shell has a cupped half shell and a lid half shell that are held together by the oyster's hinge muscle about a beak portion of the bivalve shell

420 applying a cryogen to the beak portion to substantially cool or freeze the oyster's hinge muscle

430 removing the lid or flat half shell open relative to the cupped half shelf

510 providing an oyster in a bivalve shell, wherein the shell has a cupped half shell and a lid half shell that are held shut by the oyster's hinge muscle about a beak portion of the bivalve shell that is opposite a bill portion of thereof, and wherein oyster meat is attached to the cupped half shell by the oyster's adductor muscle

520 applying a cryogen locally to substantially cool or freeze the oyster's adductor muscle to weaken its grip

530 opening the oyster's lid half shell relative to the cupped half shell to expose the oyster meat

540 detaching the oyster meat form the cupped half shell

CRYO-SHUCKING OF OYSTERS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 13/373,041, entitled CRYO-SHUCKING OF OYSTERS, naming Maxime Jean Jerome Bilet, Homaro Cantu, Grant Lee Crilly, Nathan P. Myhrvold as inventors, filed 1 Nov. 2011, which is currently co-pending or is an application of which a currently co-pending application is entitled to the benefit of the filing date.

RELATED APPLICATIONS

U.S. patent application Ser. No. 13/705,779, entitled CRYO-SHUCKING OF OYSTERS, naming Maxime Jean Jerome Bilet, Grant Lee Crilly, Nathan P. Myhrvold as inventors, filed 5 Dec. 2012, is related to the present application.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

The present application relates, in general, to culinary science and food processing technology. In particular, the application relates to techniques for shucking oysters.

BACKGROUND

Oyster is used as a common name for a number of distinct groups of bivalve mollusks, which live in marine or brackish habitats. Oysters are an important food source in coastal areas, and oyster fisheries are an important commercial industry. See e.g., website en.wikipedia.org/wiki/Oyster.

The bivalve shells of live oysters are normally tightly closed. Individual oysters can be round or more commonly oval in shape (FIG. 1). One of the valves (half-shell) is generally more rounded or convex that the other half-shell. This rounded half-shell is commonly referred to as the cupped half-shell. The other half-shell, which is flatter, acts as a lid over the cupped half-shell. A single powerful oyster muscle—the adductor muscle, which is attached to the cupped half-shell, holds the two half-shells shut tightly. The two half-shells are also joined at a hinge joint located at the circumference of the shell by a hinge muscle.

FIG. 2, which is adapted from the website oysters.us/opening.html, shows topographic features or regions that are common to all oyster shapes. The beak portion is the pointed part of any oyster. The beak portion is shown pointing toward the bottom of the FIG. 2. The oyster's hinge joint muscle is found immediately above the beak. The lip or bill is the broad flat end vertically opposite the beak. The oyster's adductor muscle is generally found to the right of the median axis running from the beak to the bill, slightly above midpoint (i.e. in the upper right quadrant as shown in FIG. 2).

Oysters must be eaten alive, or cooked alive. Shucking, refers to process of removing of the oyster meat from the tightly-closed bivalve shell of an oyster. Shucking oysters is usually accomplished manually by hand. A mechanical tool, e.g., a shortbladed oyster knife, is inserted between the two halves of the bivalve shell, close to the hinge, and twisted to break the hinge and lever the oyster half-shells apart. The knife is then used to sever the adductor muscle at its point of attachment to the cupped half, and the oyster meat removed. If the meat is to be served on the half-shell, the detached meat is turned over, cleared of any shell fragments, and left in the cupped half-shell along with the natural liquor. See e.g., FIG. 3 and websites
marylandinfo.com/sponsorships/how_to_shuck_oysters.html
fao.org/wairdocs/tan/x5954e/x5954e01.htm.

The manual process of shucking oysters is labor intensive. Labor-reducing techniques that are deployed in the commercial food-processing industry for shucking oysters may include shearing off the hinge (e.g., by guillotine) and a wide range of treatments (e.g., chemicals, heat, cold, vacuum, microwave and laser treatments) that cause the shell to spring open. All these common commercial treatments that cause the oyster shell to self-open affect the freshness, integrity and quality of the oyster meat that is scraped out from the self-opened shell.

Attention is now directed to improved or different techniques for shucking oysters.

BRIEF DESCRIPTION OF THE FIGURES

In the accompanying drawings:
FIG. 3 illustrates the steps involved in shucking an oyster manually by hand.
FIG. 3 is adapted from "how to shuck oysters" at website Marylandinfo.com;
FIG. 4 is a flow diagram illustrating an exemplary method for shucking oysters involving pre-treatment of the oysters with a cryogen, in accordance with the principles of the solutions described herein;
and FIG. 5 is a flow diagram illustrating another exemplary method for shucking oysters involving cryo-blanching the oysters, in accordance with the principles of the solutions described herein.

Throughout the figures, unless otherwise stated, the same reference numerals and characters are used to denote like features, elements, components, or portions of the illustrated embodiments.

DESCRIPTION

Oyster shucking techniques are described herein. The techniques involve use of cryogens to pre-treat oysters. In particular, the techniques may involve localized treatment of oyster muscles with cryogens. The cooling or freezing of the oyster muscles weakens them. Therefore, the mechanical forces that are required to shuck oysters treated with cryogens in the manner described herein are substantially less than those compared to those required to shuck untreated oysters. Oysters that are suitably cryogen-treated are shucked easily and cleanly.

Specific examples of methods for treating oysters with cryogens prior to shucking are described herein with reference to FIGS. 4 and 5. It will be understood that these examples are presented only for purposes of illustration and are not intended to limit the scope of the disclosure.

Figure 1:
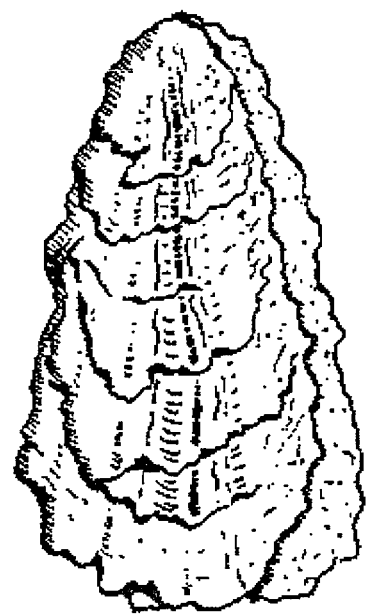
FIG. 1 is an illustration of an oval-shaped oyster.
Figure 2:
FIG. 2 is an illustration of an oyster half-shell. The figure identifies common topographic features and geometries found in most oysters.

FIG. 4 shows method 400 for cryo-shucking oysters. Method 400 includes providing an oyster in a bivalve shell, wherein the shell has a cupped half-shell and a lid half-shell that are held shut by the oyster's hinge muscle about a beak portion of the bivalve shell (410), and applying a cryogen to the beak portion to substantially cool or freeze the oyster's hinge muscle (420). Any suitable or convenient cryogen may be used (e.g., liquid nitrogen, dry ice, etc). The cryogen may be applied locally, for example, by directing a fluid cryogen stream on to the beak portion of the bivalve shell. Alternatively, the oyster's beak portion may be dipped in a fluid cryogen or otherwise placed in contact with cryogens to freeze only the hinge muscle portion. A batch of oysters may be treated at the same time, for example, placing a suitably orienting the batch (e.g., vertically as shown in FIG. 2). The beak portion may be in contact with the cryogen for a limited amount of time that is sufficient to freeze the hinge muscle only. This limited amount of time may be a function of the cryogen type (e.g. liquid nitrogen or dry ice, etc.) and the cryogen temperatures and the type of oyster shell. The amount of exposure time necessary may be determined empirically. The amount of time that the oyster is in contact with the cryogen is suitably limited so that only the hinge muscle is frozen and that too only briefly. The brief freezing of the hinge muscle likely alters the muscle's structure to weaken its elasticity and grip on the half-shells without altering or affecting the texture and taste of the remainder of the oyster flesh.

Method 400 further includes the step of removing the lid or flat half-shell (430). The lid half-shell may be removed by sliding it open relative to the cupped half-shell. Alternatively, the weakened hinge muscles may relax naturally allowing the half-shells to self-open.

EXAMPLE I

In an example, in the inventors' kitchen a batch of oysters was washed in warm water and then dipped in liquid nitrogen for about 10-15 seconds. The oysters were then washed in warm water to thaw the surface. In traditional or conventional cooking term "blanching," which involves plunging a food substance into boiling water and removing it after a brief, timed interval. In analogy, the cooling or freezing of the oyster muscle by a brief time-limited exposure to the cryogen may be referred to herein as "cryo-blanching." In the foregoing example, the cryo-blanched oysters were place on a rack in an ordinary kitchen refrigerator where they self-opened in a few hours. The cryo-blanching treatment had sufficiently altered the structure of the hinge muscles so that they relaxed naturally to open up the half-shells. The oyster meat in the opened half-shell was in its natural tender and juicy state. The natural shape of the oyster meat was undisturbed. The oyster meat was removed by sliding a blade under oyster meat to sever the adductor muscle or knob attaching it the cupped half-shell.

FIG. 5 shows method 500 for cryo-shucking oysters. Method 500 includes providing an oyster in a bivalve shell, wherein the shell has a cupped half-shell and a lid half-shell that are held shut by the oyster's hinge muscle about a beak portion of the bivalve shell that is opposite a bill portion of thereof, and wherein oyster meat is attached to the cupped half-shell by the oyster's adductor muscle to weaken its grip (510); applying a cryogen locally to substantially cool or freeze the oyster's adductor muscle to weaken its grip (520); opening the oyster's lid half-shell relative to the cupped half-shell to expose the oyster meat (530); and detaching the oyster meat form the cupped half-shell (540). In method 500 for cryo-shucking an oyster, the adductor muscle may be weakened by applying cryogen to the entire oyster shell or locally to the backside of cupped half-shell. The latter may be accomplished, for example, by placing the oysters' cupped-side down on a bed of dry ice or in shallow tray of liquid nitrogen or other cryogen. The oyster shell, submerged or partially submerged, is contact with the cryogen for only a limited amount of time so that bulk of the oyster meat is not frozen, but only the outer portions close to and in immediate thermal contact with the shell walls (e.g., the adductor and/or hinge muscle portions) are substantially cooled.

EXAMPLE II

In another example, in the inventors' kitchen a batch of oysters was washed in warm water and the dipped in liquid nitrogen for about 30-90 seconds. The oysters were then washed in warm water to thaw the surface. The cryo-blanched oysters were placed on a rack in an ordinary kitchen refrigerator, where they self-opened in a few hours. The cryo-blanching treatment had sufficiently altered the structure of the hinge muscles that they relaxed naturally to open up the half-shells. The oyster meat in the opened half-shell was in its natural tender and juicy state. The natural shape of the oyster meat was undisturbed. Further, the cryo-blanching had weakened the adductor muscle allowing the oyster meat to be easily scooped out of the cupped half-shelf using a spoon and flipped over for the oyster serving in half-shell. The shucked oyster meat was raw and juicy. Further, the oyster meat had firmer and denser feeling than that of conventionally shucked oyster meat.

The oyster shucking methods described herein may be exploited to prepare small quantities (e.g., individual food servings prepared in home kitchens) and/or large quantities (e.g., commercial food servings prepared in industrial kitchens or other commercial food processing industry).

While various aspects and embodiments have been disclosed herein, other aspects and embodiments will be apparent to those skilled in the art. For example, in Examples I and II, instead of waiting for the cryo-blanched shells to self-open shells, the covering flat half-shells may be manually slid off, physically lifted, or otherwise removed to expose the oyster meat contained in the cupped half-shell.

Further, in some industrial oyster processing the beak or other edge portion of the oyster shell is guillotined or sheared off to create an opening. In such processing, an alternative to cooling the adductor muscle through the shell wall as described above, is to apply a cryogen directly to the adductor muscle. The cryogen may be introduced through the sheared opening into a region proximate to the adductor muscle's attachment to the inner surface of the shell wall. Such cryo-treatment of the adductor muscle may loosen its grip on the shell wall and allow for easy removal of the oyster meat.

It will be understood that the various aspects and embodiments disclosed herein are for purposes of illustration and are not intended to be limiting, with the true scope and spirit being indicated by the following claims. For example, liquid nitrogen treatment may be used to open or shuck other shell fish (e.g., clams).

The invention claimed is:

1. A method for shucking oysters, comprising:
    providing an oyster in a bivalve shell, wherein the shell has a cupped half-shell and a lid half-shell that held together by the oyster's hinge muscle about a beak portion or hinge joint of the bivalve shell;
    applying a cryogen to the beak portion to substantially cool or freeze the hinge muscle; and
    removing or opening the lid half-shell relative to the cupped half-shell to expose the oyster meat.

2. The method of claim 1, wherein the cryogen is dry ice.

3. The method of claim 1, wherein the cryogen is liquid nitrogen.

4. The method of claim 3, wherein applying the cryogen to the beak portion to substantially cool or freeze the hinge muscle comprises dipping oyster in liquid nitrogen for only short time interval so that the bulk of the oyster meat remains unfrozen.

5. The method of claim 4, wherein applying the cryogen to the beak portion to substantially cool or freeze the hinge muscle comprises dipping oyster in liquid nitrogen for about 10-15 seconds.

6. The method of claim 1, further comprising, removing the oyster meat from the cupped half-shell.

7. The method of claim 6, wherein removing the oyster meat comprises sliding a blade under oyster meat in the cupped half-shell.

8. The method of claim 6, wherein sliding the blade under oyster meat in the cupped half-shell comprises cutting the oyster's adductor muscle that is attached to the cupped half-shell.

9. A method for shucking oysters, comprising:
    providing an oyster in a bivalve shell, wherein the shell has a cupped half-shell and a lid half-shell that are held shut by the oyster's hinge muscle about a beak portion of the bivalve shell that is opposite a bill portion thereof, and wherein oyster meat is attached to an inner surface of the cupped half-shell by the oyster's adductor muscle;
    cooling the adductor muscle by applying a cryogen to the oyster to cool the adductor muscle and to weaken attachment of the oyster meat to the inner surface of the cupped half-shell;
    opening the hinged lid half-shell and cupped half-shell about the bill portion of the bivalve shell; and
    detaching the oyster meat from the cupped half-shell.

10. The method of claim 9, wherein the cryogen is dry ice.

11. The method of claim 9, wherein the cryogen is liquid nitrogen.

12. The method of claim 11, wherein applying the cryogen to the oyster to cool the adductor muscle comprises dipping the oyster in liquid nitrogen for an only short time interval so that the bulk of the oyster meat remains unfrozen.

13. The method of claim 12, wherein applying the cryogen to the oyster to cool the adductor muscle comprises dipping the oyster in liquid nitrogen for about 30-90 seconds.

14. The method of claim 9, wherein cooling the adductor muscle comprises applying a cryogen to an external surface portion of the cupped half-shell.

15. The method of claim 9, further comprising, slicing an edge portion of the bivalve shell to make an opening, and wherein cooling the adductor muscle comprises injecting a cryogen through the opening into a region proximate to the adductor muscle's attachment to the cupped half-shell.

16. The method of claim 9, further comprising, detaching the oyster meat from the cupped half-shell.

17. The method of claim 16, wherein detaching the oyster meat from the cupped half-shell comprises scooping the oyster meat in the cupped half-shell using a spoon.

18. The method of claim 16, wherein detaching the oyster meat from the cupped half-shell comprises sliding a blade under oyster meat in the cupped half-shell to sever the adductor muscle.

* * * * *